May 29, 1956 H. A. MICHAELIS 2,748,243
CONTROL CIRCUITS FOR ELECTRIC FRY KETTLES
Filed Dec. 15, 1953 3 Sheets-Sheet 1

INVENTOR.
Harold A. Michaelis
BY
Smith, Olsen, Baird & Gulbrandsen Attys.

May 29, 1956  H. A. MICHAELIS  2,748,243
CONTROL CIRCUITS FOR ELECTRIC FRY KETTLES
Filed Dec. 15, 1953  3 Sheets-Sheet 2
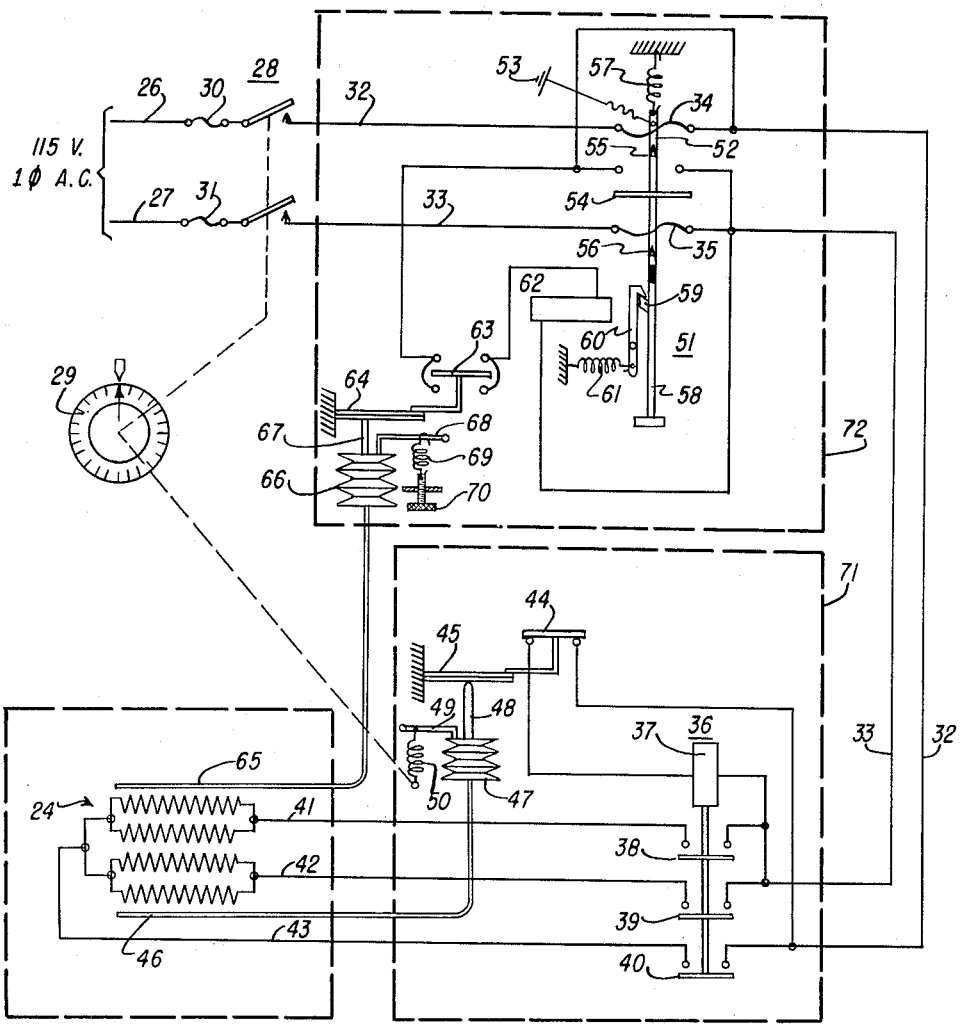
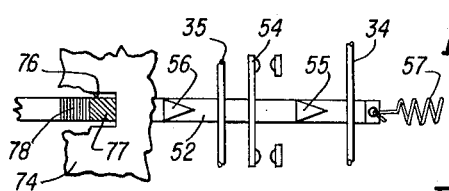
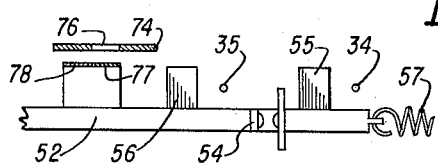
INVENTOR.
Harold A. Michaelis
BY
Smith, Olsen, Baird & Gulbrandsen
Attys.

United States Patent Office 2,748,243
Patented May 29, 1956

2,748,243

CONTROL CIRCUITS FOR ELECTRIC FRY KETTLES

Harold A. Michaelis, Elmhurst, Ill., assignor to General Electric Company, a corporation of New York Application December 15, 1953, Serial No. 398,290

13 Claims. (Cl. 219—20)

The present invention relates to control circuits for electric fry kettles, and more particularly to such control circuits incorporating protective arrangements for preventing overheating thereof in order to minimize fire hazards in connection therewith.

A conventional electric fry kettle comprises a fat container, a heating unit arranged in the container and normally submerged in the fat therein and an electric power system for the heating unit. The heating unit is ordinarily distributed in the vertical direction in order to insure uniform and proper heating of the fat in the container; whereby, in the event of an inadequate quantity of fat in the container, the upper portion of the heating unit is not submerged in the fat, but is exposed to the atmosphere above the level of the fat in the container. In this event, the upper portion of the heating unit exposed to the atmosphere is heated to an abnormally high temperature, while the lower portion of the heating unit submerged in the fat may be substantially at its normal operating temperature. This undesirable condition is very dangerous in the operation of the fry kettle, aside from the possible damage to the heating unit, since under certain operating conditions the temperature of the fry kettle may reach a level sufficiently high to ignite the vapor rising thereto from the body of fat disposed therebelow in the container.

Accordingly, it is a general object of the present invention to provide in the control circuit of an electric fry kettle, an improved protective arrangement for positively preventing overheating thereof.

Another object of the invention is to provide in an electric fry kettle, an improved control system that positively insures complete disconnection of the power source from the heating unit in the event of an abnormally high and unsafe temperature of the fat content of the fry kettle.

Another object of the invention is to provide an improved electric fry kettle control system that is so constructed and arranged that the power source may not be reconnected to the heating unit, once it is disconnected therefrom due to a fault of the character noted, except by an authorized serviceman, thereby preventing the user of the faulty fry kettle from placing it back in service without proper inspection.

A further object of the invention is to provide in an electric fry kettle control system of the character described, an improved arrangement of protective links and mechanism for effecting rupture of the links for the purpose of disconnecting the power source from the heating unit.

A still further object of the invention is to provide in an electric fry kettle control system of the character described, an improved mechanism for rupturing the protective links, which mechanism both electrically short-circuits the links and mechanically severs the links, so as positively to disconnect the power source from the heating unit and to isolate the heating unit with respect to the power source.

Further features of the invention pertain to the particular arrangement of the elements of the control circuit for the electric fry kettle, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 3 is a diagram of the electric control circuit incorporated in the fry kettle;

Fig. 4 is a greatly enlarged fragmentary plan view of the combined mechanism for short-circuiting and for severing the protective links incorporated in the electric control circuit of Fig. 3;

Fig. 5 is a greatly enlarged fragmentary side elevational view of the combined mechanism shown in Fig. 4.

Figure 2:
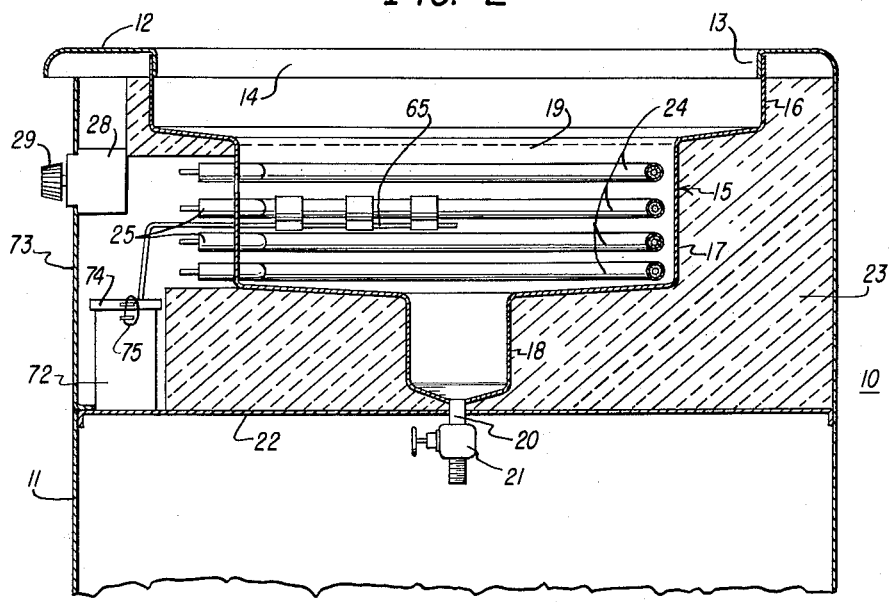
Fig. 2 is a fragmentary vertical sectional view of the upper portion of the fry kettle, taken in the direction of the arrows along the line 2—2 in Fig. 1.
Figure 1:
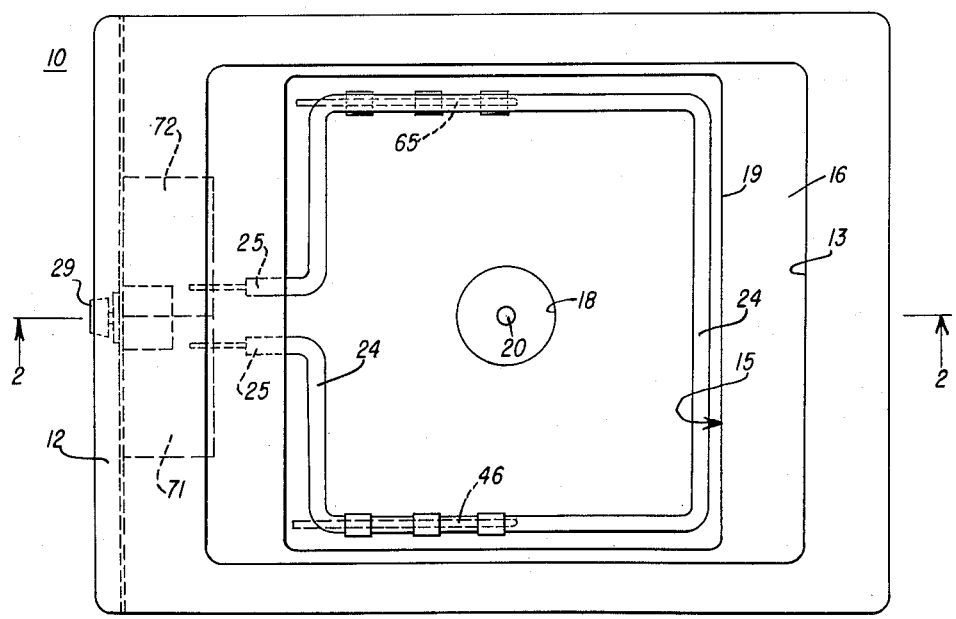
Figure 1 is a plan view of an electric fry kettle provided with a control circuit embodying the present invention.

Referring now to Figs. 1 and 2 of the drawings, the electric fry kettle 10 there illustrated, and provided with a control circuit embodying the features of the present invention, comprises an upstanding casing 11 provided with a removable top wall 12 having a substantially centrally disposed rectangular opening 13 formed therein that is surrounded by a depending flange 14 carrying a fat container 15 arranged in the upper portion of the casing 11. The container 15 includes an upper basin section 16, a connected intermediate tank section 17 and a lower sediment trap section 18. The container 15 is adapted to receive a removable fry basket, not shown, that, in turn, is adapted to receive the food that is to be fried, such, for example, as potatoes, doughnuts, etc.; and the container 15 is adapted to receive a quantity of fat, the normal fat level being adjacent to the junction between the basin section 16 and the tank section 17, as indicated by the broken line 19. The bottom of the sediment trap section 18 communicates with a depending conduit 20 that is provided with a manually operable gate valve 21 facilitating the draining of the fat from the container 15 into a receiver, not shown, that may be arranged in the lower portion of the casing 11. The upper portion of the casing 11 in which the container 15 is arranged is separated from the lower portion thereof by a suitable dividing wall 22; and a quantity of heat insulating material 23, such as fiber glass, or the like, is arranged above the divided wall 22 and filling the space between the exterior of the container 15 and the adjacent walls of the upper portion of the casing 11 for the purpose of preventing escape to the exterior of heat from the fat in the container 15.

Also the fry kettle 10 comprises a composite heating unit 24 arranged in the tank section 17 of the container 15, and that preferably takes the form of a plurality of vertically spaced-apart sections of a sheathed resistance conductor, the composite heating unit 24 including four vertically spaced-apart sections for purpose of illustration; whereby the composite heating unit 24 is distributed in the vertical direction in order to insure uniform and proper heating of the fat in the container 15. Preferably, each section of the composite heating unit 24 is of loop-like configuration generally conforming to the configuration of the tank section 17 of the container 15 and spaced inwardly with respect to the adjacent walls thereof, the extremities of each section of the composite heating unit 24 terminating in electric terminals 25 projecting through the front wall of the tank section 17 and appropriately sealed in place to prevent the escape therealong of the fat in the container 15. The terminals 25 are electrically connected together in two groups to provide two composite terminals for the composite heating unit 24 so that the individual sections of the composite heating unit 24 are energized in parallel circuit relationship.

Referring now to Fig. 3, the electric fry kettle 10 further comprises a control circuit, including a source of electric power supply, such, for example, as a 115-volts, single-phase, A. C. source, including a pair of supply conductors 26 and 27. Also, the fry kettle 10 includes a control switch 28 that is provided with a manually rotatable control knob or dial 29 having an off position and a variable on position, rotation of the manual dial 29 into its off position effecting operation of the control switch 28 into its open position, and rotation of the manual dial 29 into its on position effecting operation of the control switch 28 into its closed position. Also, rotation of the manual dial 29 in its variable on position selectively sets the cooking temperature of the fat in the container 15 that is to be maintained, as explained more fully hereinafter. The control switch 28 is connected to the pair of supply conductors 26 and 27 via a pair of line protective links 30 and 31 of the fusible type and to a pair of feed conductors 32 and 33. Arranged in the pair of feed conductors 32 and 33 is a pair of special protective links 34 and 35 of the fusible type.

Further, the fry kettle 10 comprises a control relay of the contactor type 36 provided with an operating winding 37 and three contact bridging members 38, 39 and 40 respectively controlling three cooperating pair of contacts. As illustrated, the two upper sections of the heating unit 24 may be directly connected in multiple; the two lower sections of the heating unit 24 may be directly connected in multiple; a common terminal of the two upper sections of the heating unit 24 is connected to a conductor 41; a common terminal of the two lower sections of the heating unit 24 is connected to a conductor 42; and a common terminal of the four sections of the heating unit 24 is connected to a conductor 43. One of the contacts controlled by the bridging member 38 is connected to the feed conductor 33; and the other contact controlled thereby is connected to the conductor 41. Similarly, one of the contacts controlled by the bridging member 39 is connected to the feed conductor 33; and the other contact controlled thereby is connected to the conductor 42. Finally, one of the contacts controlled by the bridging member 40 is connected to the feed conductor 32; and the other contact controlled thereby is connected to the conductor 43.

Also the control circuit comprises a first thermal control arrangement for governing the contactor 36 that includes a contact bridging member 44 controlling an associated pair of contacts; one of the contacts controlled by the bridging member 44 is connected to the feed conductor 32; and the other contact controlled thereby is connected to one terminal of the winding 37, the other terminal of the winding 37 being connected to the feed conductor 33. The contact bridging member 44 is carried by a bimetallic element 45 that comprises a portion of an ambient temperature compensating arrangement. A liquid-filled temperature responsive element 46 is operatively associated with one side of the uppermost section of the heating unit 24, as illustrated in Fig. 1; which element 46 is operatively connected to a resilient bellows 47, also included in the liquid system; which bellows 47 is provided with an operating member 48 extending into cooperating relation with the bimetallic element 45. Also, operatively associated with the bellows 47 is a pivotally mounted lever 49 that is biased by a cooperating coil spring 50 to contract the bellows 47, the outer end of the coil spring 50 being operatively connected to the manual dial 29.

In view of the foregoing description of the first thermal control arrangement, it will be understood that the contact bridging member 44 normally occupies its closed position when the temperature of the fat in the container 15 is below a previously set cooking temperature established by the manual dial 29, the manual dial 29 in its variable on position adjusting the initial bias applied by the coil spring 50 through the lever arm 49 to the bellows 47.

Also, the fry kettle 10 comprises a combined severing and short-circuiting mechanism 51 operatively associated with the protective links 34 and 35 and including a bar 52 mounted for sliding movements between normal and operated positions, the bar 52 being connected to the casing 11 and to ground potential, as indicated at 53, and carrying a contact bridging member 54 controlling an associated pair of contacts, as well as two cutters 55 and 56 respectively operatively associated with the protective links 34 and 35. The bar 52 is biased into its normal position by a cooperating coil spring 57 and is provided with a manual operating rod 58 that cooperates with latch mechanism for restraining the bar 52 in its operated position. More particularly, the operating rod 58 carries a lug 59 that cooperates with the outer end of a pivotally mounted latch 60, the outer end of the latch 60 being biased by a coil spring 61 into cooperating relation with the lug 59. Also the latch 60 constitutes the armature of an associated trip magnet 62. One of the contacts controlled by the contact bridging member 54 is connected to the feed conductor 32 on the heating unit side of the cooperating protective link 34; and the other of the contacts controlled by the contact bridging member 54 is connected to the feed conductor 33 on the heating unit side of the cooperating protective link 35.

The normal cooperation between the cutters 55 and 56 and the respective protective links 34 and 35, when the bar 52 occupies its operated position, is clearly illustrated in Figs. 4 and 5; whereby the protective links 34 and 35 are out of contact with the respective cutters 55 and 56 and the grounded bar 52.

Also the control circuit comprises a second thermal control arrangement for governing the mechanism 51 that includes a contact bridging member 63 controlling both associated front and back pairs of contacts. One of the contacts of each pair controlled by the bridging member 63 is connected to the feed conductor 32 on the heating unit side of the cooperating protective link 34; and the other of each pair of contacts controlled thereby is connected to one terminal of the trip magnet 62, the other terminal of the trip magnet 62 being connected to the feed conductor 33 on the heating unit side of the cooperating protective link 35. The contact bridging member 63 is carried by a bimetallic element 64 that comprises a portion of an ambient temperature compensating arrangement. A liquid-filled temperature responsive element 65 is operatively associated with the other side of the next to the uppermost section of the heating unit 24, as best illustrated in Fig. 2; which element 65 is operatively connected to a resilient bellows 66, also included in the liquid system; which bellows 66 is provided with an operating member 67 extending into cooperating relation with the bimetallic element 64. Also, operatively associated with the bellow 66 is a pivotally mounted lever 68 that is biased by a cooperating coil spring 69 to contract the bellows 66, the outer end of the coil spring 69 being operatively connected to an associated manual adjusting screw 70.

In view of the foregoing description of the second thermal control arrangement, it will be understood that the contact bridging member 63 normally occupies an intermediate position with respect to the cooperating front and back pairs of contacts controlled thereby so as normally to interrupt the circuit for the trip magnet 62.

The contactor 36 and the bridging member 44, together with the cooperating bimetallic element 45 and the bellows 47, are arranged in a first metal-clad housing 71, indicated by the rectangular broken line in Fig. 3; and similarly, the mechanism 51 and the bridging member 63, together with the cooperating bimetallic element 64 and the bellows 66, are arranged in a second metal-clad housing 72, indicated by the rectangular broken line in Fig. 3. As illustrated in Figs. 1 and 2, the metal-clad housings 71 and 72 may be disposed in the casing 11 above the dividing wall 22 and accessible from the exterior after removal of the uppermost portion of the front wall of the casing 11, constituting a removable panel 73, also carrying the control switch 28. Preferably the metal-clad housings 71 and 72 arranged behind the removable front panel 73 are sealed against entry by the user of the fry kettle 10, but are accessible to an authorized serviceman. For example, the metal-clad housing 72, illustrated in Fig. 2, may comprise a removable cover 74 that is normally secured in place and is sealed against removal by a cooperating seal, indicated generally at 75; which seal 75 must be broken by the authorized serviceman and subsequently replaced, thereby rendering the metal-clad housing 72 tamper-proof.

When the fry kettle 10 is initially installed in service, the authorized serviceman operates the rod 58 so that the bar 52 is moved from its normal position into its operated position and latched in place in its operated position by virtue of the cooperation between the latch 60 and the lug 59. At this time, the protective fuses 34 and 35 are arranged in place connecting together the two sections of the feed conductors 32 and 33. Also, the manual screw 70 is adjusted to apply the desired initial bias by the coil spring 69 upon the bellows 66 so as to establish the predetermined abnormally high and unsafe temperature of the heating unit 24, at which it is desired to trip the latch 60. Thereafter, the authorized serviceman replaces the cover 74 upon the metal-clad housing 72 and applies the seal 75, rendering the housing 72 tamper-proof. In a similar manner, the housing 71 is rendered tamper-proof when the fry kettle 10 is placed in service.

Considering now the operation of the fry kettle 10, in order to carry out a cooking operation, the user rotates the manual dial 29 from its off position into its variable on position. When the manual dial 29 is thus operated into its on position, the control switch 28 is operated into its closed position, thereby connecting the supply conductors 26 and 27 to the feed conductors 32 and 33. Also, as previously noted, the adjustment of the manual dial 29 in its variable on position adjusts the bias applied by the coil spring 50 to the bellows 47 so as to establish the desired cooking temperature of the fat in the container 15. At this time potential appears between the feed conductors 32 and 33 energizing the winding 37 of the contactor 36; whereby the contactor 36 closes the bridging members 38, 39 and 40 in order that the four sections of the heating unit 24 are energized in multiple across the feed conductors 32 and 33. As the temperature of the fat in the container 15 rises, the thermal elements 46 and 65 are influenced so as to effect corresponding influences upon the respective bellows 47 and 66.

When the temperature of the fat in the container 15 reaches the previously established cooking temperature, the influence exerted by the thermal element 46 upon the bellows 47 is sufficient to cause the operating member 48 to exert sufficient pressure upon the bimetallic element 45 to bring about opening of the contact bridging member 44 so that the winding 37 of the contactor 36 is deenergized in order that the bridging members 38, 39 and 40 are restored effecting deenergization of the heating unit 24. Subsequently when the temperature of the fat in the container 15 subsides, the influence exerted by the thermal element 46 subsides; whereby the bellows 47 effects reclosure of the contact bridging member 44 so that the contactor 36 is again operated in order again to energize the heating unit 24 across the feed conductors 32 and 33. In view of the foregoing, it will be understood that the first thermal control arrangement, including the thermal element 46, controls the contactor 36 in order selectively to control the energization of the heating unit 24 so as to maintain the previously established cooking temperature of the fat in the container 15.

In the normal operating range of temperatures of the fat in the container 15, the influence exerted upon the thermal element 65 is modest; whereby the influence exerted upon the bellows 66 is modest so that the contact bridging member 63 is retained in its intermediate position retaining interrupted the circuit for the trip magnet 62. On the other hand, in the course of operation of the fry kettle 10, should the first thermal control arrangement prove defective and fail to effect opening of the contact bridging member 44, the fat, by reason of continued operation of the heating unit 24 would rise to an abnormally high and unsafe temperature effecting a corresponding influence upon the thermal element 65, such that the influence exerted upon the bellows 66 is adequate to move the bridging member 63 to close its front contacts. In the event of this abnormally high and unsafe temperature of the upper portion of the heating unit 24, the trip magnet 62 is energized incident to the closure of the front contacts associated with the bridging member 63; whereby the latch 60 is attracted effecting the release of the lug 59 and the consequent release of the bar 52. When the bar 52 is thus released, it is returned by the coil spring 57 from its operated position back into its normal position; whereby the bridging member 54 closes the associated pair of contacts completing a direct short between the feed conductors 32 and 33 on the heating unit side of the protective links 34 and 35, so as to bring about fusion of the links 34 and 35 and the consequent disconnection of the two sections of the feed conductors 32 and 33 in order to effect the complete removal of power from the heating unit 24. Moreover, the grounded bar 52 is connected to the bridging member 54, whereby ground potential is applied to the two feed conductors 32 and 33 extending to the contactor 36 so as positively to insure deenergization of the winding 37 thereof and the consequent opening of the contact bridging members 38, 39 and 40. Moreover, as the bar 52 is moved into its normal position, the cutters 55 and 56 carried thereby move through the space normally occupied by the respective protective links 34 and 35 so that in the event that either one of the protective links is not fused by the previously completed short-circuit it is mechanically cut by the associated cutter. Moreover, since the two cutters 55 and 56 are directly connected to the grounded bar 52 there is the possibility of the completion of a direct short-circuit between the protective links 34 and 35 due to the engagements thereof with the respective cutters 55 and 56. Accordingly, in any case, the return of the bar 52 into its normal position positively insures rupture of the protective links 34 and 35 and grounding-out of the sections of the feed conductors 32 and 33 extending to the contactor 36; whereby there is no possibility of potential appearing upon the terminals of the heating unit 24, after tripping of the mechanism 51.

Since the metal-clad housing 72 is sealed against entry by the user of the fry kettle 10, it is necessary for the user to call an authorized serviceman so that he may inspect the fry kettle 10 before placing it back in service.

In order to place the fry kettle 10 back in service, the authorized serviceman must (after removal of the front panel 73) break the seal 75 and remove the cover 74 from the metal-clad housing 72 so as to render the mechanism 51 accessible.

The serviceman then operates the rod 58 so as to move the bar 52 from its normal position into its operated position, the bar 52 being restrained in its operated position by virtue of the cooperation between the lug 59 and the latch 60, when the trip magnet 62 is deenergized. The protective links 34 and 35 are then replaced; whereupon the cover 74 may be returned upon the metal-clad housing 72 and a new seal 75 arranged in place.

As illustrated in Figs. 4 and 5, the position of the mechanism 51 may be observed from the exterior of the metal-clad housing 72, after removal of the front panel 73, by virtue of an indicator arrangement including an opening 76 provided in the cover 74 of the metal-clad housing 72. More particularly, a red target 77 and a green target 78 are carried by the bar 52 in cooperating relation with the opening 76; the red target 77 being visible through the opening 76 when the mechanism 51 occupies its operated position, as shown in Figs. 4 and 5, and the green target 78 being visible through the opening 76 when the bar 52 occupies its normal position. Accordingly, after removal of the front panel 73, the authorized serviceman may, from an inspection of the indicator arrangement, determine the position of the mechanism 51 prior to breaking the seal 75 and removing the cover 74 from the metal-clad housing 72.

In the first thermal control arrangement, it will be understood that the bimetallic element 45 compensates the operation of the contactor 36 against variations as a consequence of ambient temperature changes. Specifically, as the ambient temperature is increased, the bimetallic element 45 exerts an influence tending to close the contact bridging member 44; which influence is against the influence exerted by the bellows 47. Moreover, the bellows 47 is calibrated against the rotary position of the manual dial 29 over an appropriate cooking temperature range that might, for example, extend from about 200° F. to 400° F.

Similarly, in the second thermal control arrangement, it will be understood that the bimetallic element 64 compensates the operation of the mechanism 51 against variations as a consequence of ambient temperature changes. Specifically, as the ambient temperature is increased, the bimetallic element 64 exerts an influence tending further to open the front contacts; which influence is against the influence exerted by the bellows 66. Moreover, the bellows 66 is calibrated against the rotary position of the manual screw 70 over an appropriate abnormally high and unsafe temperature range that might, for example, extend from 450° F. to 500° F.

Also, it will be appreciated, in conjunction with the second thermal control arrangement, that should the contained liquid be lost from the thermal element 65 or the bellows 66, due to a leak in the liquid system, the coil spring 69 effects sufficient contraction of the bellows 66 so that the bridging member 63 closes its associated back contacts, again completing the circuit for operating the trip magnet 62; whereby the mechanism 51 is returned from its operated position back into its normal position, in the manner previously explained.

Experience has indicated that the user of the fry kettle 10 will sometimes operate it with a fat content insufficient to submerge the uppermost section of the heating unit 24. This is not of itself inherently dangerous, since the rising temperature of the heating unit 24 will quickly reach the cut-out temperature of the first thermal control arrangement; whereby the contact bridging member 44 will normally be operated into its open position. However, should the first thermal control arrangement not function properly, the temperature of the fat mentioned could reach an unsafe level, were it not for the protection afforded by the second thermal control arrangement. More particularly, in the event the uppermost and the next to the uppermost sections of the heating unit 24 respectively associated with the thermal elements 46 and 65 are exposed to the atmosphere, the power to the heating unit 24 will normally be interrupted under the control of the thermal element 46, or upon failure thereof, under the control of the thermal element 65. Accordingly, the cooperation between the second thermal control arrangement, including the thermal element 65, and the first thermal control arrangement, including the thermal element 46, constitutes a fail-safe interlock therebetween, thereby positively preventing an abnormally high and unsafe temperature of both the fat in the container 15 and the respective sections of the heating unit 24.

In view of the foregoing, it will be understood that the mechanism 51 comprises protective mechanism and is not ordinarily operated, except in the event of one of the abnormal conditions previously described; whereby the protective links 34 and 35 may have a higher current rating than the normal line protective links 30 and 31. In this case, in the event of an ordinary short-circuit at the terminals of the heating unit 24, the protective links 30 and 31 would be preferentially fused with respect to the protective links 34 and 35. On the other hand, the protective links 34 and 35 may have a lower current rating than the normal line protective links 30 and 31 in the event it is desired that the preferential fuse protection be within the metal-clad housing 72 in case of an ordinary short-circuit at the terminals of the heating unit 24. In passing, it is noted that the National Electric Code requires a special fuse protective device to have a lower current rating than the normal line fuse protective device; whereby for this reason, it is preferable that the special protective links 34 and 35 have a lower current rating than the line protective links 30 and 31.

Figure 6:
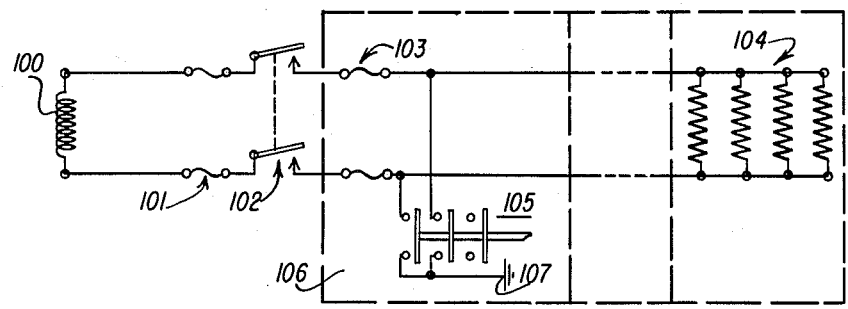
Figs. 6 to 9, inclusive, are respective diagrams of other modified forms of the electric control circuit for the fry kettle.

Referring now to Fig. 6, a modified form of the control circuit, embodying the features of the present invention, for the electric fry kettle 10 is illustrated in skeleton outline; this form of the control circuit employing a single phase two-wire ungrounded source of A. C. supply, including a single phase transformer 100. In this arrangement, there are illustrated: the line protective links 101, the control switch 102, the special protective links 103, the heating unit 104, and the mechanism 105. The mechanism 105 is provided with three contact bridging members (only two of the contact bridging members being usefully employed) for the short-circuiting purpose previously described; and in this arrangement the provision of the cutters operatively associated with the protective links 103 is optional. As previously noted, the protective links 103 and the mechanism 105 are arranged in the metal-clad tamper-proof housing, indicated by the broken rectangle 106, for the purpose previously explained. In the operation of this form of the control circuit the mechanism 105, upon operating, grounds-out to the casing of the fry kettle 10 each of the feed conductors, as illustrated at 107, on the heating unit side thereof; whereby the protective links 103 are not only short-circuited, but the feed conductors are grounded-out. As previously noted, the arrangement of the cutters individual to the protective links 103 is optional, but is not required in order to secure entirely satisfactory operation.

Figure 7:
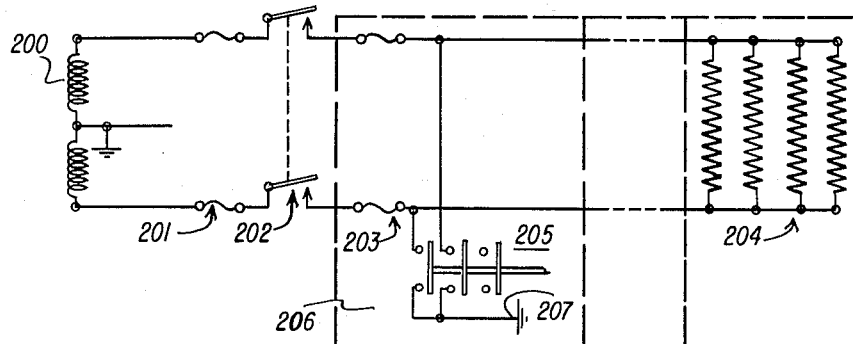

Referring now to Fig. 7, another modified form of the control circuit, embodying the features of the present invention, for the electric fry kettle 10 is illustrated in skeleton outline. This form of the control circuit is substantially identical to the form illustrated in Fig. 6, described above, except that a single phase three-wire grounded neutral A. C. source of power supply is employed, although the grounded neutral is not connected to the fry kettle 10. The operation of this form of the control circuit is substantially identical to that described above, although it will be understood that in this case the operation of the mechanism 205 positively insures the rupture of each of the protective links 203, since a voltage appears between each of the feed conductors and the ground connection, indicated at 207.

Figure 8:
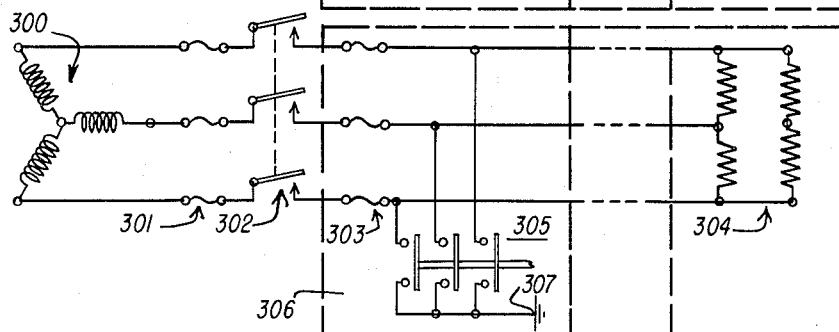

Referring now to Fig. 8, a further modified form of the control circuit, embodying the features of the present invention, for the electric fry kettle 10 is illustrated in skeleton outline; this form of the control circuit employing a three-phase ungrounded A. C. source of supply, including a star-connected transformer 300. In this arrangement, there are illustrated: the line protective links 301, the control switch 302, the special protective links 303, the heating unit 304, and the mechanism 305. The mechanism 305 is provided with three contact bridging members for the short-circuiting purpose, previously described; and in this arrangement, the provision of the cutters operatively associated with the protective links 303 is optional. As previously noted, the protective links 303 and the mechanism 305 are arranged in the metal-clad tamper-proof housing, indicated by the broken rectangle 306, for the purpose previously explained. In the operation of this form of the control circuit, the mechanism 305, upon operating, grounds-out to the casing of the fry kettle 10 each of the feed conductors, as illustrated at 307, on the heating unit side thereof; whereby the protective links 303 are not only short-circuited, but the feed conductors are grounded-out. As previously noted, the arrangement of the cutters individual to the protective links 303 is optional, but is not required in order to secure entirely satisfactory operation.

Figure 9:
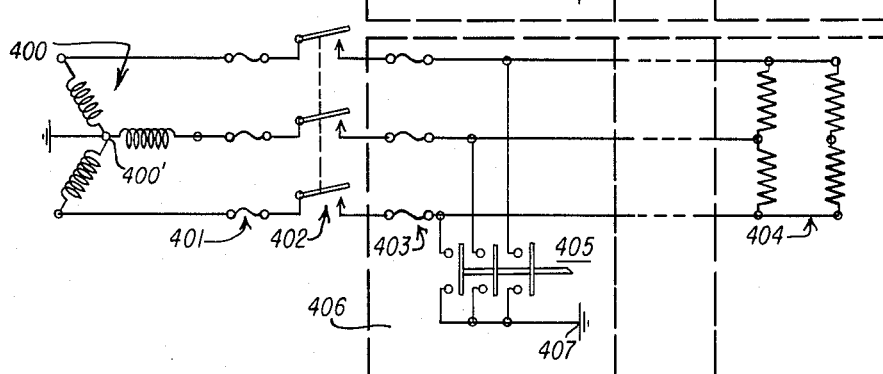

Referring now to Fig. 9, a still further modified form of the control circuit, embodying the features of the present invention, for the electric fry kettle 10 is illustrated in skeleton outline. This form of the control circuit is substantially identical to the form illustrated in Fig. 8, described above, except that a three-phase grounded A. C. source of supply, including a star-connected transformer 400 having a grounded center tap, indicated at 400', is employed. The operation of this form of the control circuit is substantially identical to that described above, although it will be understood that in this case the operation of the mechanism 405 positively insures the rupture of each of the protective links 403, since a voltage appears between each of the feed conductors and the ground connection, indicated at 407.

In view of the foregoing, it is apparent that there has been provided an improved control circuit for an electric fry kettle, that positively protects the heating unit therein against an abnormally high and unsafe temperature, thereby minimizing fire hazard in conjunction with the operation of the fry kettle. Also the utility of the protective system is further enhanced by virtue of the arrangement, whereby it is tamper-proof as far as the user is concerned; thereby insuring inspection by an authorized serviceman, before placing the fry kettle back into service in the event of a fault.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an electric fry kettle including a fat container, a heating unit arranged in said fat container and normally submerged in the fat therein, feed conductors connected to said heating unit, a source of electric power, a control switch selectively operative into closed and open positions respectively to connect and to disconnect said source with respect to said feed conductors in order selectively to energize said heating unit, and manually operable means for selectively operating said control switch; the combination comprising protective links arranged in said feed conductors, said links being subject to fusion in response to the passage therethrough of an abnormally high and unsafe electric current, mechanism operative both to sever said links and to short-circuit said feed conductors on the heating unit side of said links in order positively to insure rupture of said links and the consequent disconnection of said source from said heating unit, thermal responsive means operatively associated with said fat container and governed by an abnormally high and unsafe temperature for operating said mechanism, and a metal-clad housing for said links and said mechanism that is inaccessible to the user of the fry kettle.

2. In an electric fry kettle including a fat container, a heating unit arranged in said fat container and normally submerged in the fat therein, feed conductors connected to said heating unit, a source of electric power, a control switch selectively operative into closed and open positions respectively to connect and disconnect said source with respect to said feed conductors in order selectively to energize said heating unit, and manually operable means for selectively operating said control switch; the combination comprising protective links arranged in said feed conductors, said links being subject to fusion in response to the passage therethrough of an abnormally high and unsafe electric current, mechanism operative to sever said links in order to effect the disconnection of said source from said heating unit, thermal responsive means operatively associated with said fat container and governed by an abnormally high and unsafe temperature for operating said mechanism, and a metal-clad housing for said links and said mechanism that is inaccessible to the user of the fry kettle.

3. In an electric fry kettle including a fat container, a heating unit arranged in said fat container and normally submerged in the fat therein, feed conductors connected to said heating unit, a source of electric power, a control switch selectively operative into closed and open positions respectively to connect and disconnect said source with respect to said feed conductors in order selectively to energize said heating unit, and manually operable means for selectively operating said control switch; the combination comprising protective links arranged in said feed conductors, said links being subject to fusion in response to the passage therethrough of an abnormally high and unsafe electric current, switch mechanism operative to short-circuit said feed conductors on the heating unit side of said links in order to effect rupture of said links and the consequent disconnection of said source from said heating unit, thermal responsive means operatively associated with said fat container and governed by an abnormally high and unsafe temperature for operating said mechanism, and a metal-clad housing for said links and said switch mechanism that is inaccessible to the user of the fry kettle.

4. The electric fry kettle combination set forth in claim 3, wherein said housing is sealed against entry by the user of the fry kettle.

5. In an electric fry kettle including an upstanding fat container, a heating unit arranged in said fat container and distributed between the top and the bottom thereof and normally submerged in the fat therein, feed conductors connected to said heating unit, a source of electric power, a control switch selectively operative into closed and open positions respectively to connect and disconnect said source with respect to said feed conductors in order selectively to energize said heating unit, and manually operable means for selectively operating said control switch; the combination comprising protective links arranged in said feed conductors, said links being subject to fusion in response to the passage therethrough of an abnormally high and unsafe electric current, switch mechanism operative to short-circuit said feed conductors on the heating unit side of said links in order to effect rupture of said links and the consequent disconnection of said source from said heating unit, the upper portion of said heating unit being subject to an abnormally high and unsafe temperature in the event of an inadequate amount of fat in said fat container such that the upper portion of said heating unit is not submerged in the fat therein, a temperature sensing element arranged in said fat container and operatively associated with the upper portion of said heating unit and operative into a control condition in response to said abnormally high and unsafe temperature of the upper portion of said heating unit, and control means responsive to operation of said temperature sensing element into its control condition for operating said switch mechanism.

6. In an electric fry kettle including an upstanding fat container, a heating unit arranged in said fat container and distributed between the top and the bottom thereof and normally submerged in the fat therein, feed conductors connected to said heating unit, a source of electric power, a control switch selectively operative into closed and open positions respectively to connect and to disconnect said source with respect to said feed conductors in order selectively to energize said heating unit, and manually operable means for selectively operating said control switch; the combination comprising protective links arranged in said feed conductors, said links being subject to fusion in response to the passage therethrough of an abnormally high and unsafe electric current, switch mechanism movable between a normal position completing a short-circuit on said feed conductors on the heating unit side of said links and an operated position interrupting said short-circuit, means biasing said switch mechanism into its normal position, manually operable means for moving said switch mechanism against said biasing means into its operated position, latch means for restraining said switch mechanism in its operated position, the upper portion of said heating unit being subject to an abnormally high and unsafe temperature in the event of an inadequate amount of fat in said fat container such that the upper portion of said heating unit is not submerged in the fat therein, a temperature-sensing element arranged in said fat container and operatively associated with the upper portion of said heating unit and operative into a control condition in response to said abnormally high and unsafe temperature of the upper portion of said heating unit, and means responsive to operation of said temperature-sensing element into its control condition for releasing said latch means.

7. In an electric fry kettle including a fat container, a heating unit arranged in said fat container and normally submerged in the fat therein, feed conductors connected to said heating unit, a source of electric power, a control switch selectively operative into closed and open positions respectively to connect and to disconnect said source with respect to said feed conductors in order selectively to energize said heating unit, and manually operable means for selectively operating said control switch; the combination comprising protective links arranged in said feed conductors, said links being subject to fusion in response to the passage therethrough of an abnormally high and unsafe electric current, switch mechanism movable between a normal position completing a short-circuit on said feed conductors on the heating unit side of said links and an operated position interrupting said short-circuit, a manually operable member for moving said switch mechanism into its operated position, thermal responsive means operatively associated with said fat container and governed by an abnormally high and unsafe temperature for moving said switch mechanism back into its normal position, and a metal-clad housing for said links and said switch mechanism and said manually operable member.

8. The electric fry kettle combination set forth in claim 7, and further comprising means for indicating exteriorly of said housing the position of said switch mechanism.

9. In an electric fry kettle including a fat container, a heating unit arranged in said fat container and normally submerged in the fat therein, feed conductors connected to said heating unit, a source of electric power, a control switch selectively operative into closed and open positions respectively to connect and to disconnect said source with respect to said feed conductors in order selectively to energize said heating unit, and manually operable means for selectively operating said control switch; the combination comprising protective links arranged in said feed conductors, said links being subject to fusion in response to the passage therethrough of an abnormally high and unsafe electric current, a bar mounted for movement transversely of said links between a normal position and an operated position, cutters operatively associated with said links and operative in response to movement of said bar from its operated position back into its normal position for severing said links to effect the disconnection of said source from said heating unit, means biasing said bar into its normal position, manually operable means for moving said bar against said biasing means from its normal position into its operated position, latch means for restraining said bar in its operated position, and thermal responsive means operatively associated with said fat container and governed by an abnormally high and unsafe temperature for releasing said latch means.

10. The electric fry kettle combination set forth in claim 5, wherein said temperature-sensing element is of the fluid-filled type and is also operative into its control condition in response to the loss of fluid therefrom.

11. The electric fry kettle combination set forth in claim 5, and further comprising ambient temperature-responsive means for compensating said control means against ambient temperature variations in its operation of said switch mechanism.

12. The electric fry kettle combination set forth in claim 5, and further comprising switching apparatus selectively operative into closed and open positions respectively to close and to open said feed conductors in order selectively to energize said heating unit, thermal responsive means operatively associated with said fat container and governed by the temperature of the fat in said fat container for selectively operating said switching apparatus between its closed and open positions in order to maintain the fat in said fat container substantially at a predetermined cooking temperature, and manually operable means for selectively adjusting said thermal responsive means in order selectively to preset said predetermined cooking temperature.

13. The electric fry kettle set forth in claim 12, wherein said manually operable means for selectively operating said control switch and said manually operable means for selectively adjusting said thermal responsive means include a common manual control member having an off position and a variable on position, said manual control member in its off and on positions effecting operation of said control switch into its respective open and closed positions, said manual control member in its variable on position effecting selective adjustment of said thermal responsive means.

References Cited in the file of this patent

UNITED STATES PATENTS

| 2,358,215 | Darling | Sept. 12, 1944 |
| 2,376,789 | Leonard | May 22, 1945 |
| 2,538,574 | Kolisch | Jan. 16, 1951 |
| 2,553,949 | Smith | May 22, 1951 |

FOREIGN PATENTS

| 475,130 | Great Britain | Nov. 15, 1937 |